(No Model.)
J. MOOSBURGGER.
COVER FOR BARRELS.
No. 368,957. Patented Aug. 30, 1887.
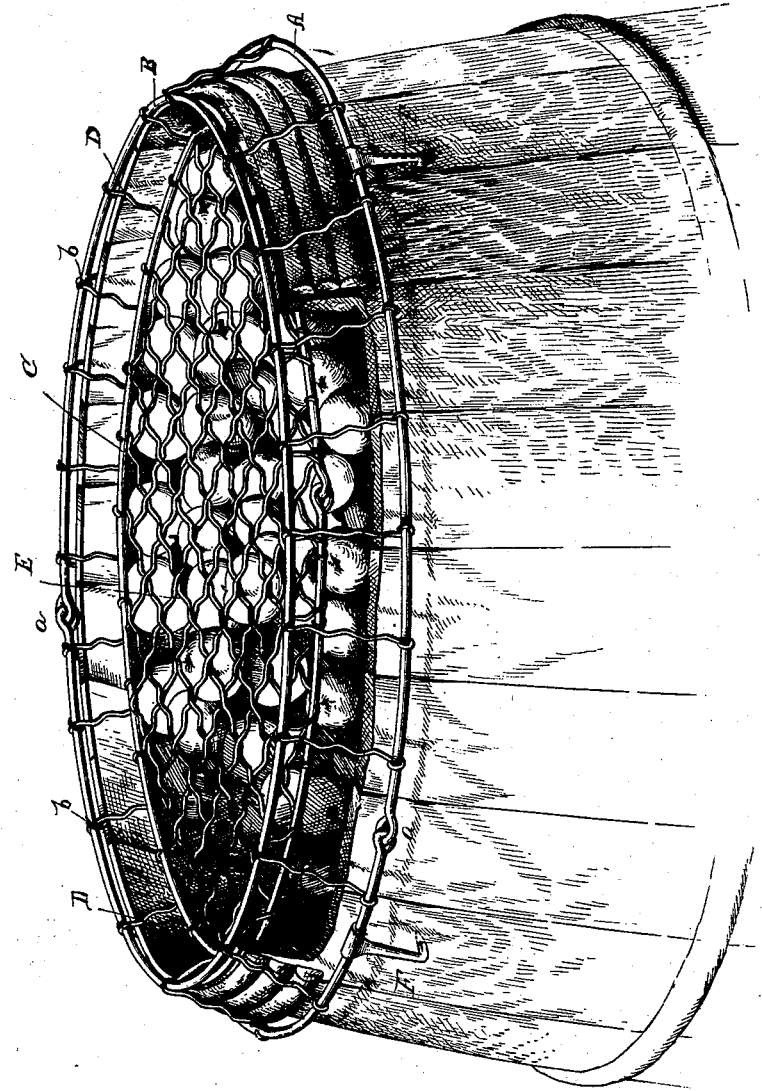
Witnesses
Inventor
Joseph Moosburgger,
By his Attorney

United States Patent Office.

JOSEPH MOOSBURGGER, OF ST. PAUL, MINNESOTA.

COVER FOR BARRELS.

SPECIFICATION forming part of Letters Patent No. 368,957, dated August 30, 1887.

Application filed January 10, 1887. Serial No. 223,917. (No model.)

*To all whom it may concern:*

Be it known that I, JOSEPH MOOSBURGGER, a citizen of the United States, residing at St. Paul, in the county of Ramsey and State of Minnesota, have invented certain new and useful Improvements in Covers for Barrels and other Receptacles; and I do hereby declare the following to be a full, clear, and exact description of the invention, such as will enable others skilled in the art to which it appertains to make and use the same.

My invention relates to covers for barrels and other vessels, and has for its object to provide a cover cheap to construct, easy to apply and detach, effective to hold the contents of the vessel in place, so that the vessel can be moved and rolled about without disturbing the contents, and which will permit the contents to be inspected without liability of any of them being pilfered.

To such ends the invention consists in the construction and the combination of parts hereinafter particularly described and claimed, reference being had to the accompanying drawings, forming part thereof, and which is a perspective of a part of a barrel with my invention applied thereto, a portion of the barrel being broken away.

The cover is composed of a series of bands or rings—say three—A, B, and C, each having its two ends looped or connected together by eyes *a*, and the three united to one another by strands of wire D. The outside ring, A, is the largest, so as to fit around the outside of the vessel or barrel, while the inside ring, C, is the smallest, so as to fit down inside the barrel or vessel, the intermediate ring, B, being of a diameter between the outer and inner rings, and of about the diameter of a barrel or other vessel to which it may be applied. This construction adapts the cover to different sizes of barrels or vessels, as the sides of the cover will diverge from the top ring downwardly, thus forming a V-shaped channel to fit on the inside and the outside of the vessel. It also causes the cover to fit close to the vessel, so that no hand can be passed up between the cover and the vessel to take out any of the contents of the vessel. The inner band or ring, C, will extend low enough down into the vessel to cause the main body E of the netting to lie close to the contents of the vessel, so as to hold the latter in place and keep them from jostling about while the vessel is being moved or rolled from one place to another. This is quite important where fruit of different varieties is packed, because the movement of the fruit itself has a tendency to bruise it; but injury in that way is prevented by the netting lying close to the fruit.

The strands of wire D, forming the netting, are applied by hooking one end around the inner band or ring, C, as illustrated, and then passing it under the band on the opposite side to where it is hooked, then up and over the middle band or ring, B, and then down, and hooking it to the outside band or ring, A. The strands inside of the rings are interwoven with one another to form grating or netting, as shown, and are secured to the middle band or ring in some suitable manner by winding them around the band, or, say, by means of tie-cords *b*, which may be of wire, the same being passed around the band or ring and the strands, and having their ends united by twisting them together. The strands composing the netting are made of strong and stout wire, not easily bent, and the whole structure forms a strong screen or netting cover, cheaply made, and strong and durable in use. The cover is held to the vessel by means of hooks F, hinged to the outer ring, A, and having pointed ends, which permit them to be driven into the side of the vessel, so as to secure the cover thereto.

It will be observed that the central portion of the cover is grated, while the strands forming the same are extended in an unwoven state to form the diverging sides. Such construction enables the strands to be manipulated to better advantage in forming the sides than could be done if the sides were woven the same as the body, as the strands are of stiff material, difficult to bend when interwoven.

The depressed portion of the cover—that is, the portion that lies within the vessel—forms a tray which holds fruit or other commodity which may be laid therein. The cover not only serves to expose to view the contents of the vessel and protect them against pilfering and prevent them from jostling about in moving the vessel, but also serves as a tray for containing and exhibiting other fruits or articles.

I have shown a circular cover applied to a barrel; but that is only for purposes of illustration, and I wish it understood that the cover may be of any form desired and suitable for the use to be made of it.

Having described my invention and set forth its merits, what I claim is—

1. A grated receptacle-cover composed of an outer and an inner band, an intermediate band lying in a higher plane than the other bands, and a series of strands connecting the several bands and forming a central grated portion to cover a receptacle, substantially as described.

2. A grated receptacle-cover composed of the series of three bands, the middle one lying in a higher plane than the others, and the series of strands connected at one end to the inner band, then passing around the middle band, and thence downward and connected to the outer band, substantially as described.

3. A grated receptacle-cover formed of strands interwoven with one another to form a central grated portion, and then extended in single unwoven strands upwardly above the plane of the central portion, and then downwardly to form diverging sides, and a band to which the single strands are connected to hold them in position, substantially as described.

In testimony whereof I affix my signature in presence of two witnesses.

JOSEPH MOOSBURGGER.

Witnesses:
HENRY C. JAMES,
J. S. ROBERTSON.